United States Patent
Okuyama et al.

(10) Patent No.: US 9,307,201 B2
(45) Date of Patent: Apr. 5, 2016

(54) COUNTERPART TERMINAL INFORMATION MANAGEMENT SYSTEM, COMMUNICATION TERMINAL, COMMUNICATION SYSTEM, AND RECORDING MEDIUM

(71) Applicants: Taro Okuyama, Tokyo (JP); Yoshiko Aono, Kanagawa (JP)

(72) Inventors: Taro Okuyama, Tokyo (JP); Yoshiko Aono, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1 day.

(21) Appl. No.: 14/483,840

(22) Filed: Sep. 11, 2014

(65) Prior Publication Data

US 2015/0070460 A1    Mar. 12, 2015

(30) Foreign Application Priority Data

Sep. 11, 2013 (JP) .................... 2013-188416

(51) Int. Cl.
*H04N 7/15* (2006.01)
*H04L 29/06* (2006.01)
*H04L 29/08* (2006.01)
*H04M 3/42* (2006.01)

(52) U.S. Cl.
CPC .............. *H04N 7/15* (2013.01); *H04L 65/1089* (2013.01); *H04L 67/303* (2013.01); *H04M 3/42127* (2013.01); *H04M 3/42008* (2013.01); *H04M 2203/2044* (2013.01); *H04M 2203/6009* (2013.01)

(58) Field of Classification Search
CPC ........ H04N 7/15; H04N 7/152; H04L 67/303; H04L 65/1089; H04M 3/4217; H04M 3/42008; H04M 2203/6009; H04M 2203/2044

USPC ............................. 348/14.01–14.16; 709/204
See application file for complete search history.

(56) References Cited

U.S. PATENT DOCUMENTS

2006/0168344 A1*  7/2006  Tsuchiya ............... G06Q 10/10
                                                                 709/245
2008/0044031 A1   2/2008  Mishra
2012/0131648 A1   5/2012  Hayashida

FOREIGN PATENT DOCUMENTS

| JP | 3-259363 | 11/1991 |
| JP | 2002-041250 | 2/2002 |
| JP | 2005-182331 | 7/2005 |
| JP | 2007-028405 | 2/2007 |
| JP | 2007-258889 | 10/2007 |
| JP | 2011-061314 | 3/2011 |
| JP | 2013-085208 | 5/2013 |

OTHER PUBLICATIONS

Extended European Search Report issued Feb. 26, 2015 in Patent Application No. 14184174.2-1851.

* cited by examiner

*Primary Examiner* — Melur Ramakrishnaiah
(74) *Attorney, Agent, or Firm* — Oblon, McClelland, Maier & Neustadt, L.L.P

(57) ABSTRACT

A counterpart terminal information management system (50) includes: a terminal manager (5002) that manages, for each one of a plurality of terminals (10), terminal identification information for identifying the terminal, and terminal related information previously set by default, in association with each other; a counterpart terminal manager (5003) that manages, for each one of the plurality of terminals (10), the terminal identification information for identifying the terminal, counterpart terminal identification information for identifying a candidate counterpart terminal that may be requested by the terminal to have communication with, and counterpart terminal related information individually set by a user who operates the terminal (10), in association with one another; a receiver (51) that receives, from a first terminal (10*aa*), a request to share a candidate counterpart terminal managed for the first terminal (10*aa*) with the second terminal (10*ac*), and information indicating whether to permit or reject sharing of the counterpart terminal related information individually set by the user of the first terminal (10*aa*) with the second terminal (10*ac*); and a transmitter (51) that transmits information regarding the candidate counterpart terminal managed for the first terminal (10*aa*) to the second terminal (10ac). In response to the information indicating to permit sharing of the counterpart terminal related information, the transmitter (51) transmits the counterpart terminal related information of the candidate counterpart terminal to be shared, which is managed by the counterpart terminal manager (5003) in association with the terminal identification information of the first terminal (10*aa*). in response to the information indicating to reject sharing of the counterpart terminal related information, the transmitter (51) transmits the terminal related information of the candidate counterpart terminal to be shared, which is managed by the terminal manager (5001) in association with the terminal identification information of the candidate counterpart terminal.

9 Claims, 15 Drawing Sheets

FIG. 6

| TERMINAL ID | PASSWORD |
|---|---|
| 01aa | aaaa |
| 01ab | abab |
| 01ba | baba |
| ... | ... |

FIG. 7

| TERMINAL ID | NAME | OPERATION STATE | IP ADDRESS |
|---|---|---|---|
| 01aa | GROUP a, BRANCH a, COMPANY X | ON LINE | 1.2.1.3 |
| ... | ... | ... | ... |
| 01ag | GROUP g, BRANCH a, COMPANY X | ON LINE | 1.2.2.9 |
| ... | ... | ... | ... |
| 01ba | GROUP a, BRANCH b, COMPANY X | ON LINE | 1.2.2.3 |
| ... | ... | ... | ... |
| 01db | GROUP b, BRANCH d, COMPANY Y | OFF LINE | 1.4.2.4 |

FIG. 8

| STARTING TERMINAL ID | COUNTERPART TERMINAL ID | NAME |
|---|---|---|
| 01aa | 01ac | MR. c |
| 01aa | 01ad | MR. d, GENERAL MANAGER |
| 01aa | 01ae | MR. e |
| 01aa | 01af | CUSTOMER f |
| 01aa | 01ag | MR. g |
| ... | ... | ... |
| 01ac | 01ae | MR. e |
| ... | ... | ... |
| 01db | 01aa | ... |
| ... | ... | ... |

FIG. 9

| GROUP NAME | GROUP ID | MEMBER TERMINAL ID | OWNER TERMINAL ID | USER TERMINAL ID |
|---|---|---|---|---|
| PROJECT A | 0001 | 01ad, 01ae, 01af, 01ag | 01aa | — |
| REGULAR TEAM | 0002 | 01ac, 01ae | 01ac | 01ae |

FIG. 10

| SHARE REQUEST SENDER TERMINAL ID | SHARE REQUEST DESTINATION TERMINAL ID | GROUP ID | MEMBER TERMINAL ID | |
|---|---|---|---|---|
| | | | SHARE ENTIRE INFORMATION | SHARE COUNTERPART TERMINAL |
| 01aa | 01ac | 0001 | 01ad | 01ae, 01ag |
| ... | ... | ... | ... | ... |

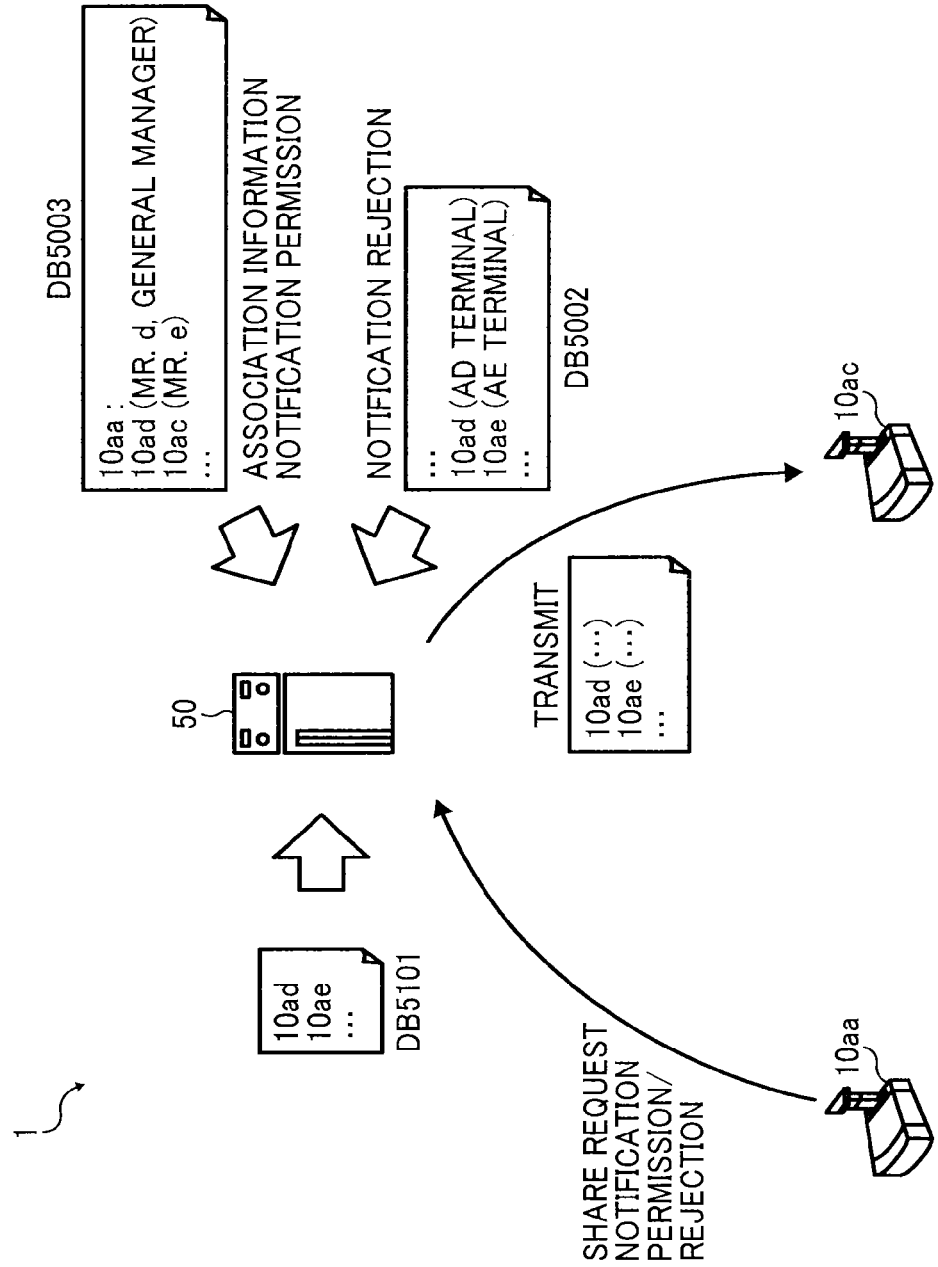

FIG. 14

| GROUP NAME | |
|---|---|
| PROJECT A | SHARE REQUEST |
| ... | ... |

FIG. 15

| ☑ | 01ac | MR. c |
|---|---|---|
| ☐ | 01ad | MR. d, GENERAL MANAGER |
| ... | ... | ... |

FIG. 16

ⓘ THE GROUP "PROJECT A" WILL BE SHARED.
PLEASE SELECT A COUNTERPART TERMINAL(S) AND
INFORMATION TO BE SHARED.

| SHARE ONLY COUNTERPART TERMINAL(S) | SHARE COUNTERPART TERMINAL(S) AND NAME(S) | NAME |
|---|---|---|
| ○ | ⦿ | MR. d, GENERAL MANAGER |
| ⦿ | ○ | MR. e |
| ○ | ○ | CUSTOMER F |
| ⦿ | ○ | MR. g |
| ... | ... | ... |

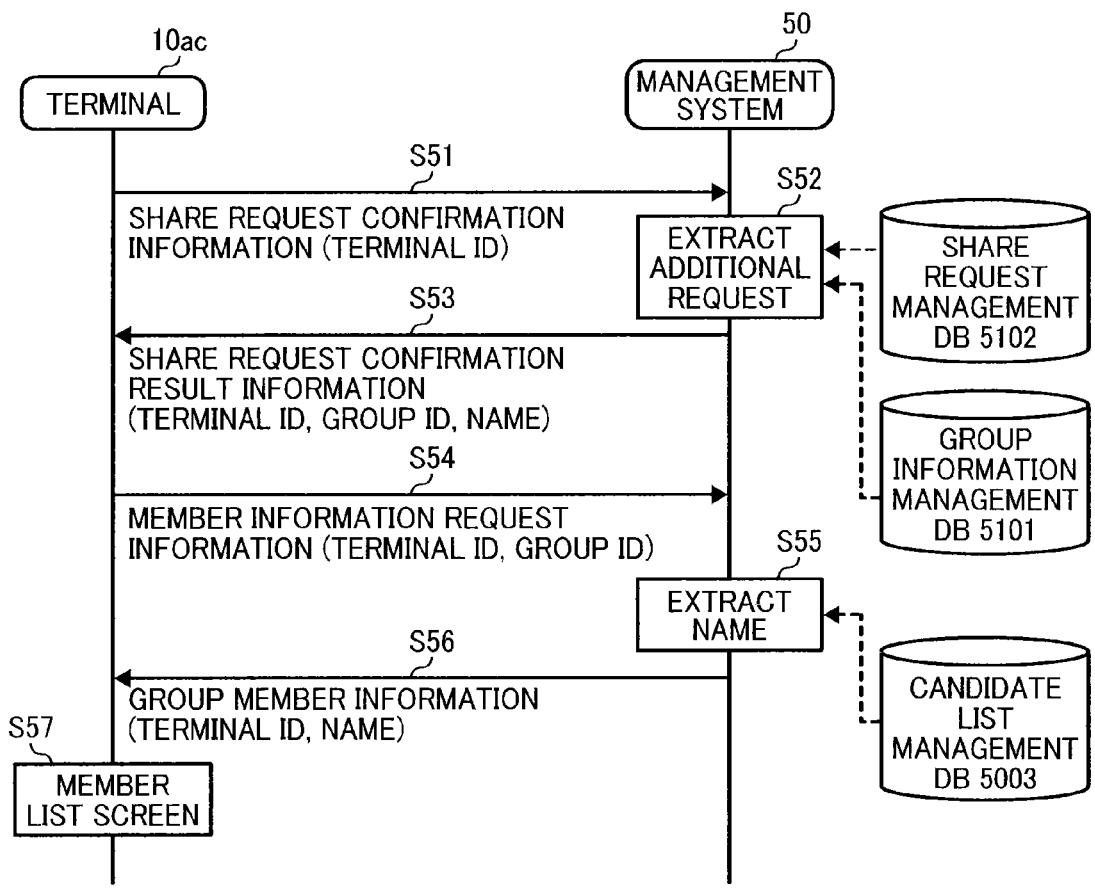

SHARE REQUEST SENDER: 01aa
PROJECT NAME: PROJECT A

| TERMINAL ID | NAME |
|---|---|
| 01ad | MR. d, GENERAL MANAGER |
| 01ae | MS. e |
| 01aa | GROUP g, MAIN OFFICE b, COMPANY X |

[ USE ]  [ NO USE ]

| GROUP NAME | GROUP ID | MEMBER TERMINAL ID | OWNER TERMINAL ID | USER TERMINAL ID |
|---|---|---|---|---|
| PROJECT A | 0001 | 01ad, 01ae, 01af, 01ag | 01aa | – |
| REGULAR TEAM | 0002 | 01ac, 01ae | 01ac | 01ae |
| PROJECT A | 0003 | 01ad, 01ae, 01ag | 01ac | – |

| GROUP NAME | GROUP ID | MEMBER TERMINAL ID | OWNER TERMINAL ID | USER TERMINAL ID |
|---|---|---|---|---|
| PROJECT A | 0001 | 01aa, 01ab, 01ac, 01ca | 01aa | 01ac |
| REGULAR MEETING | 0002 | 01ac, 01ae | 01ac | 01ae |

COUNTERPART TERMINAL INFORMATION MANAGEMENT SYSTEM, COMMUNICATION TERMINAL, COMMUNICATION SYSTEM, AND RECORDING MEDIUM

CROSS-REFERENCE TO RELATED APPLICATIONS

This patent application is based on and claims priority pursuant to 35 U.S.C. §119(a) to Japanese Patent Application No. 2013-188416, filed on Sep. 11, 2013, in the Japan Patent Office, the entire disclosure of which is hereby incorporated by reference herein.

BACKGROUND

1. Technical Field

The present invention relates to managing information regarding counterpart terminals.

2. Description of the Related Art

Communication systems that perform communication via a communication network such as the Internet or a dedicated line have become popular in recent years due to a demand for reducing business trip costs and time. To start communication in a communication system, a method that selects a desired counterpart terminal from a candidate list indicating one or more candidate counterpart terminals for communication and gives a communication start request has been used.

In order to make it more convenient for a communication terminal to select a counterpart terminal, a method that enables sharing of a personal address book serving as a candidate list in a facsimile communication system is known.

SUMMARY

Example embodiments of the present invention include a counterpart terminal information management system including: a terminal manager that manages, for each one of a plurality of terminals, terminal identification information for identifying the terminal, and terminal related information previously set by default, in association with each other; a counterpart terminal manager that manages, for each one of the plurality of terminals, the terminal identification information for identifying the terminal, counterpart terminal identification information for identifying a candidate counterpart terminal that may be requested by the terminal to have communication with, and counterpart terminal related information individually set by a user who operates the terminal, in association with one another; a receiver that receives, from a first terminal, a request to share a candidate counterpart terminal managed for the first terminal with the second terminal, and information indicating whether to permit or reject sharing of the counterpart terminal related information individually set by the user of the first terminal with the second terminal; and a transmitter that transmits information regarding the candidate counterpart terminal managed for the first terminal to the second terminal. In response to the information indicating to permit sharing of the counterpart terminal related information, the transmitter transmits the counterpart terminal related information of the candidate counterpart terminal to be shared, which is managed by the counterpart terminal manager in association with the terminal identification information of the first terminal. In response to the information indicating to reject sharing of the counterpart terminal related information, the transmitter transmits the terminal related information of the candidate counterpart terminal to be shared, which is managed by the terminal manager in association with the terminal identification information of the candidate counterpart terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an authentication management table;

FIG. 7 is a conceptual diagram illustrating a terminal management table;

FIG. 8 is a conceptual diagram illustrating a candidate list management table;

FIG. 9 is a conceptual diagram illustrating a group information management table;

FIG. 10 is a conceptual diagram illustrating a share request management table;

FIG. 11 is a conceptual diagram illustrating a transmission/reception of various types of information in the communication system of FIG. 1;

FIG. 14 is an example illustration of a group name display screen;

FIG. 15 is an example illustration of a share request destination selection acceptance screen;

FIG. 16 is an example illustration of a share details confirmation screen;

FIG. 18 is a sequence diagram illustrating example operation of accepting a share request;

FIG. 19 is an example illustration of a share request notification screen;

Figure 1:
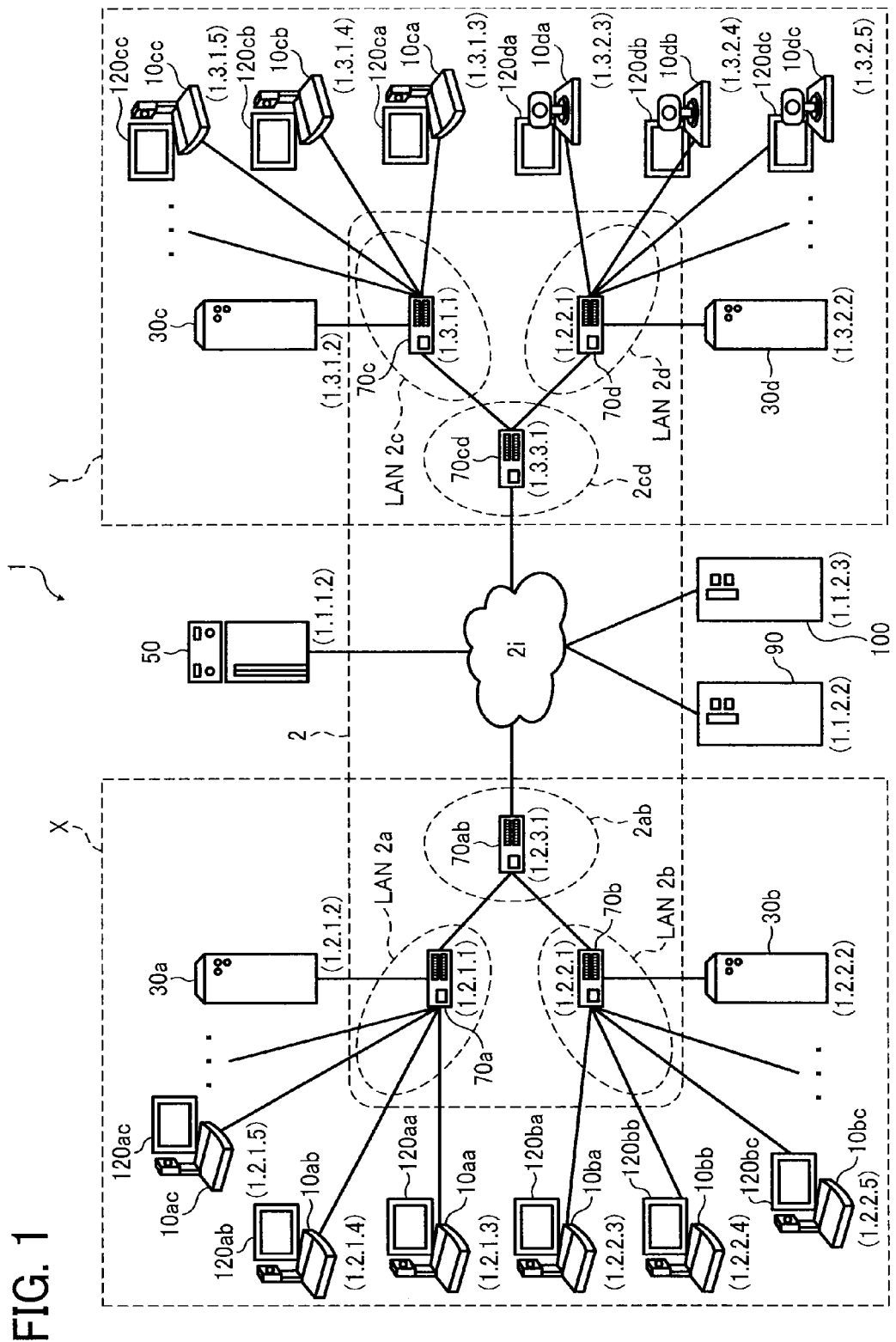
FIG. 1 is a schematic diagram of a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described using the drawings.

<<Overall Configuration>>

First, the overall configuration of the embodiment will be described referring to FIG. 1. FIG. 1 is a schematic diagram of a communication system 1 according to the embodiment of the present invention.

The communication system 1 illustrated in FIG. 1 includes a communication system that intercommunicates information between a plurality of communication terminals 10 via a management system 50. In this example, the communication system is a system for intercommunicating information, feelings, or the like between a plurality of communication terminals via a communication management system, and an example thereof includes a video conference system and a videoconference system.

In the embodiment, the communication system, the communication management system, and the communication terminals will be described while assuming a videoconference system serving as an example of the communication system, a videoconference management system serving as the communication management system, and videoconference terminals serving as an example of the communication terminals. That is, the communication terminal and the communication management system according to the embodiment of the present invention are applied not only to a videoconference system, but also to another communication system. Although the example in the embodiment is described as a "videoconference", this may alternatively be any other video communication.

The communication system 1 illustrated in FIG. 1 includes a plurality of communication terminals (10aa, 10ab, . . . ), displays (120aa, 120ab, . . . ) for the respective communication terminals (10aa, 10ab, . . . ), a plurality of relay devices (30a, 30b, 30c, and 30d), the communication management system 50, a program providing system 90, and a maintenance system 100. The plurality of communication terminals 10 perform communication by transmitting and receiving image data and sound data serving as examples of content data.

Hereinafter, the "communication management system" may simply be represented as the "management system". The "communication terminal" may simply be represented as the "terminal". In addition, an arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30".

The relay devices 30 illustrated in FIG. 1 relay content data between the plurality of terminals 10. The management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a communication management program for causing the management system 50 to realize various functions (or for causing the management system 50 to function as various elements), and the communication management program can be transmitted to the management system 50.

The maintenance system 100 is a computer for performing maintenance, management, or conservation of at least one of the terminals 10, the relay devices 30, the management system 50, and the program providing system 90. For example, in the case where the maintenance system 100 is located in one country, and the terminals 10, the relay devices 30, the management system 50, or the program providing system 90 is/are located outside that country, the maintenance system 100 remotely performs, via a communication network 2, maintenance, management, or conservation of at least one of the terminals 10, the relay devices 30, the management system 50, and the program providing system 90. In addition, the maintenance system 100 performs maintenance such as management of the model number, serial number, sales contact, maintenance checkup, or a past history of failures of at least one of the terminals 10, the relay devices 30, the management system 50, and the program providing system 90 without having the communication network 2 therebetween.

By the way, the terminals (10aa, 10ab, 10ac, . . . ), the relay device 30a, and the router 70a are connected to be communicable with each other by a local area network (LAN) 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab, thereby configuring a communication network within a certain range. The certain range is, for example, a company. The LAN 2a in FIG. 1 is configured in a branch a of a company X, and the LAN 2b is configured in a branch b of the company X.

In contrast, the terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd, thereby configuring a communication network within a certain range. The certain range is, for example, a company. The LAN 2c in FIG. 1 is configured in a branch c of a company Y, and the LAN 2d is configured in a branch d of the company Y. The company X and the company Y are connected to be communicable with each other from the routers (70ab and 70cd), respectively, via the Internet 2i.

In addition, the management system 50 and the program providing system 90 are connected to be communicable with the terminals 10 and the relay devices 30 via the Internet 2i. The management system 50 and the program providing system 90 may be located in the company X or the company Y, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired portion, but also a portion where communication is performed wirelessly, such as Wireless Fidelity (WiFi) or Bluetooth (registered trademark).

In addition in FIG. 1, four digits indicated below each of the terminals 10, each of the relay devices 30, the management system 50, each of the routers 70, and the program providing system 90 indicates an IP address in an abbreviated form in the general Internet Protocol version 4 (IPv4). For example, the IP address of the terminal 10aa is "1.2.1.3". Although IPv6 may be used instead of IPv4, IPv4 is used in order to make the description simple.

Note that the terminals 10 may be used not only for communication between different companies or different branches or for communication between different rooms in the same company or branch, but also for communication within the same room or for outdoor-indoor communication or outdoor-outdoor communication. In the case where the terminals 10 are used outside, wireless communication using a cellular phone communication network or the like is performed.

<<Hardware Configuration>>

Figure 2:
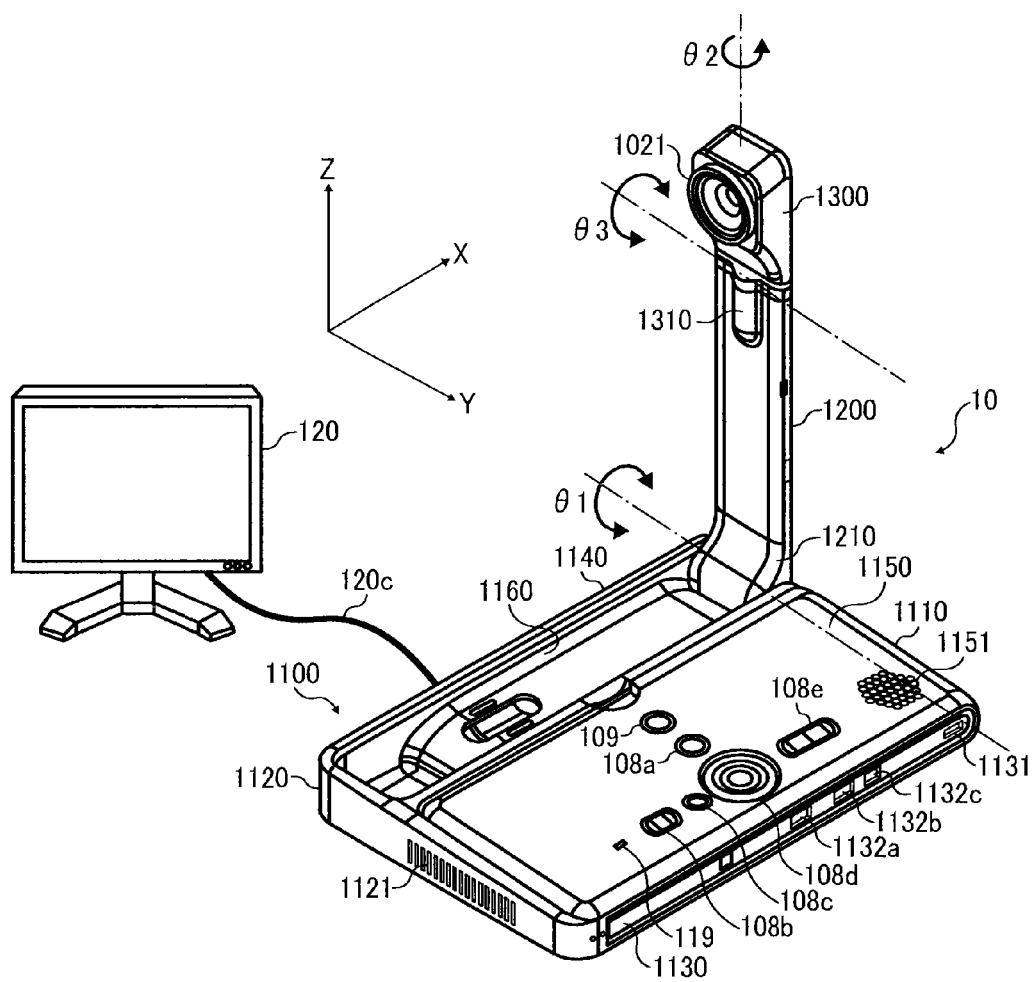
FIG. 2 is an external view of a terminal of the communication system of FIG. 1.

The hardware configuration of the embodiment will be described. FIG. 2 is an external view of a terminal 10 according to the embodiment of the present invention. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 2, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within the range of a tilt angle θ1 of 135 degrees with respect to the casing 1100. FIG. 2 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, in which the state illustrated in FIG. 2 serves as 0 degrees.

Since the relay devices 30, the management system 50, the program providing system 90, and the maintenance system 100 each have the same appearance as that of a general server computer, descriptions of the appearances thereof are omitted.

Figure 3:
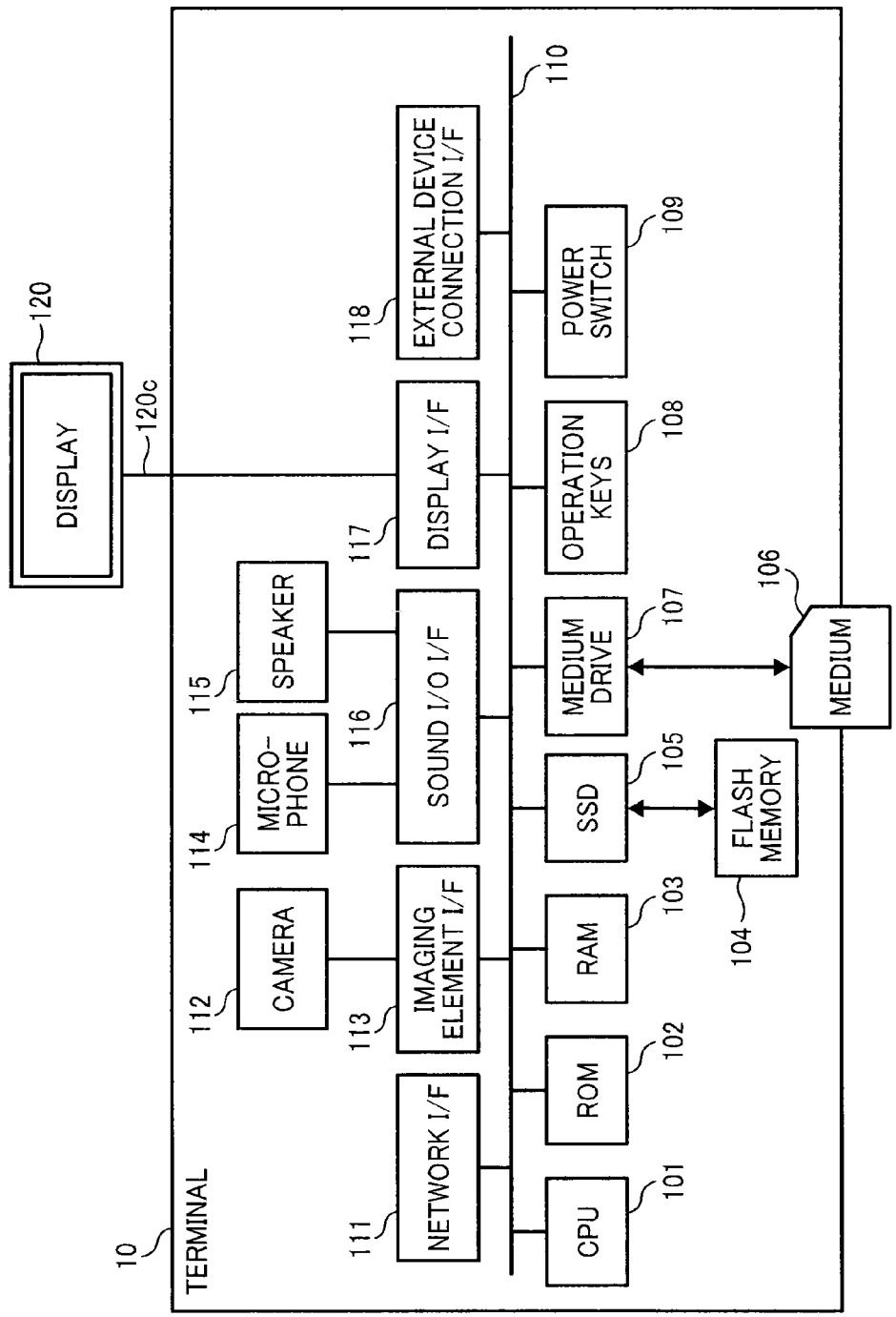
FIG. 3 is a hardware configuration diagram of the terminal of FIG. 2.

FIG. 3 is a hardware configuration diagram of the terminal 10 according to the embodiment of the present invention. As illustrated in FIG. 3, the terminal 10 includes a central processing unit (CPU) 101 that controls the overall operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a carrier medium 106 such as a flash memory, the operation keys 108 operated in the case of, for example, selecting a counterpart terminal for the terminal 10, the power switch 109 for turning ON/OFF the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 2 in order to connect various external devices, and a bus line 110 such as an address bus and a data bus for electrically connecting the above-described elements as illustrated in FIG. 3.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and distributed. In addition, the terminal program may be stored on the ROM 102, instead of the flash memory 104.

Figure 4:
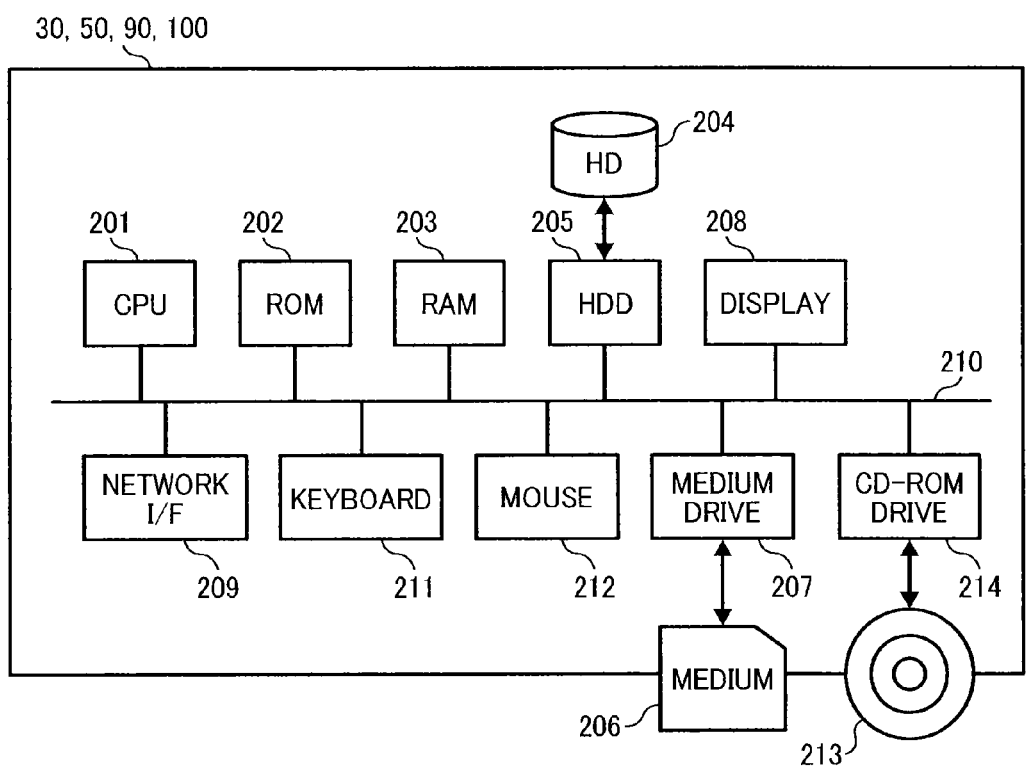
FIG. 4 is a hardware configuration diagram of a management system, a relay device, a program providing system, or a maintenance system of the communication system of FIG. 1.

FIG. 4 is a hardware configuration diagram of the management system 50 according to the embodiment of the present invention. The management system 50 includes a CPU 201 that controls the overall operation of the management system 50, a ROM 202 that stores a program used for controlling the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements as illustrated in FIG. 4.

Note that the communication management program may be recorded in a file in an installable format or an executable format on a computer-readable recording medium such as the recording medium 206 or the CD-ROM 213 and distributed. In addition, the communication management program may be stored on the ROM 202, instead of the HD 204.

In addition, since the relay devices 30 have a hardware configuration that is the same as or similar to that of the above-described management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described management system 50, descriptions thereof are omitted. Note that the HD 204 stores a program providing program for controlling the program providing system 90, or a maintenance program. Also in this case, the program providing program or the maintenance program may be recorded in a file in an installable format or an executable format on a computer-readable recording medium such as the recording medium 206 or the CD-ROM 213 and distributed. In addition, the program providing program or the maintenance program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<<Functional Configuration>>

Figure 5:
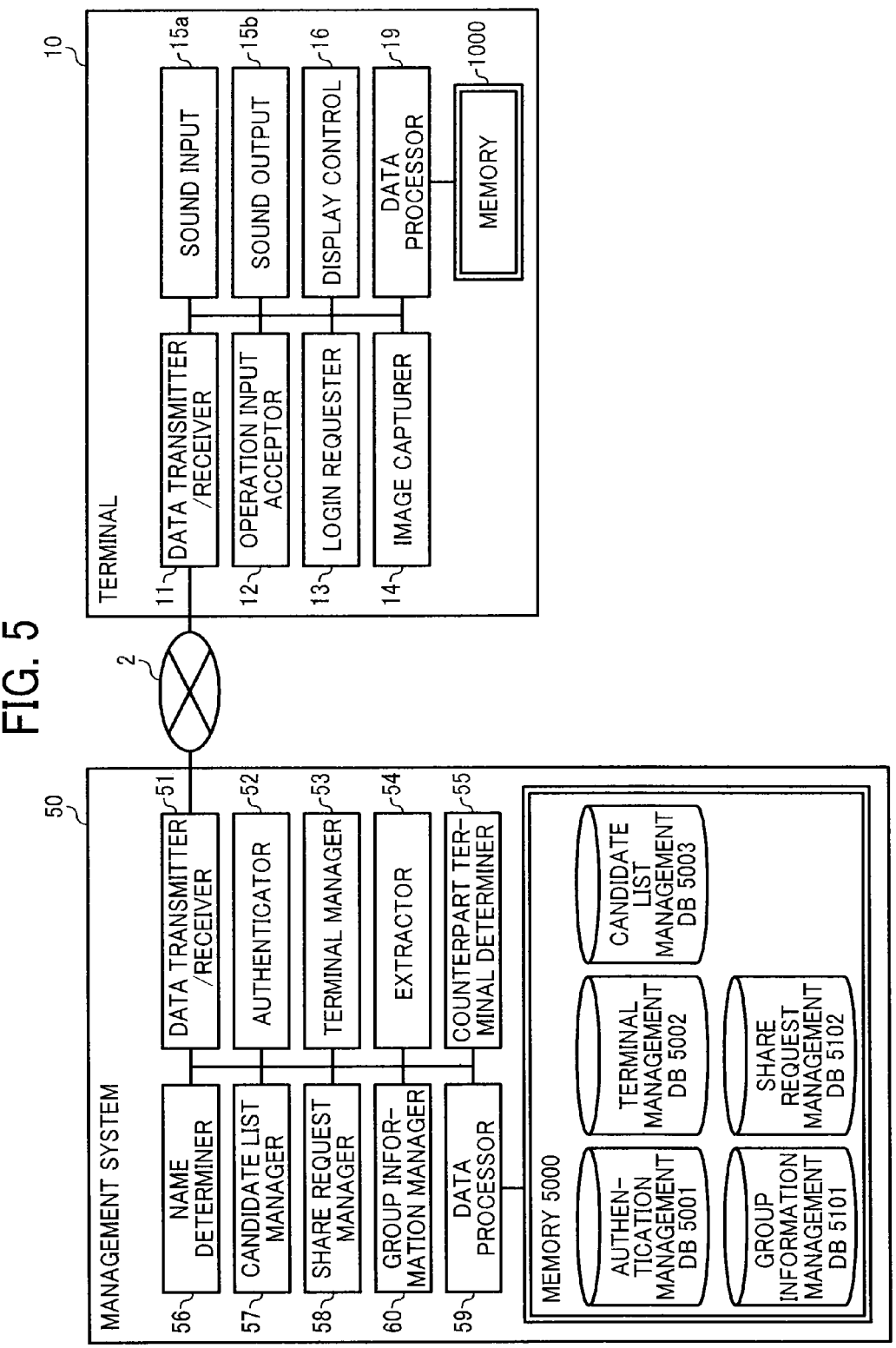
FIG. 5 is a functional block diagram of the terminal and the management system included in the communication system of FIG. 1.

Next, the functional configuration of the embodiment of the present invention will be described. FIG. 5 is a functional block diagram of a terminal 10 and the management system 50 included in the communication system 1 of the embodiment of the present invention. In FIG. 5, the terminal 10 and the management system 50 are connected to be capable of communicating data via the communication network 2. For simplicity, the program providing system 90 is omitted in FIG. 5.

<Functional Configuration of Terminal>

The terminal 10 includes a data transmitter/receiver 11, an operation input acceptor 12, a login requester 13, an image capturer 14, a sound input unit 15a, a sound output unit 15b, a display control 16, and a data processor 19. These elements are functions that are realized by or elements that are caused to function by any of the hardware structure illustrated in FIG. 3 that is/are caused to operate in response to a command from the CPU 101 in accordance with the terminal program expanded from the flash memory 104 to the RAM 103. In addition, the terminal 10 includes a memory 1000 configured by the RAM 103 or the flash memory 104 illustrated in FIG. 3.

(Functional Configuration of Terminal)

Next, referring to FIGS. 3 and 5, functional configuration of the terminal 10 will be described. Note that, in the following description of functional configuration of the terminal 10, among elements illustrated in FIG. 3, relationships with main elements for realizing functional configuration of the terminal 10 will also be described.

The data transmitter/receiver 11 of the terminal 10 illustrated in FIG. 5 is realized by a command from the CPU 101 illustrated in FIG. 3 and by the network I/F 111 illustrated in FIG. 3, and performs transmission/reception of various types of data (or information) to/from another terminal, apparatus, or system via the communication network 2.

Before starting communication with a desired counterpart terminal, the data transmitter/receiver 11 starts receiving, from the management system 50, operation state information indicating the operation state of each terminal 10 serving as a candidate counterpart terminal. The operation state information not only indicates the operation state of each terminal 10 (whether the terminal 10 is online or offline), but also indicates a detailed state such as whether the terminal 10 whose state is online is now communicating or the user of the terminal 10 is not at the terminal 10. In addition, the operation state information not only indicates the operation state of each terminal 10, but also indicates various states, such as the state that the cable 120c is disconnected from the terminal 10, the state that the terminal 10 can output sound but not images, or the state that the terminal 10 is muted.

The operation input acceptor 12 is realized by a command from the CPU 101 illustrated in FIG. 3 and by the operation keys 108 and the power switch 109 illustrated in FIG. 3, and accepts various inputs from the user.

The login requester 13 is realized by a command from the CPU 101 illustrated in FIG. 3, and automatically transmits, from the data transmitter/receiver 11 to the management system 50 via the communication network 2, login request information indicating a login request and the current IP address of a starting terminal. In addition, when the user turns the power switch 109 from on to off, the data transmitter/receiver 11 transmits to the management system 50 state information indicating that the power is turned off, and then the operation input acceptor 12 completely turns off the power. Accordingly, the management system 50 side can detect that the power of the terminal 10 is turned from on to off.

The image capturer 14 is realized by a command from the CPU 101 illustrated in FIG. 3 and by the camera 112 and the imaging element I/F 113 illustrated in FIG. 3. The image capturer 14 captures an image of a subject and outputs image data obtained by capturing the image.

The sound input unit 15a is realized by a command from the CPU 101 illustrated in FIG. 3 and by the sound input/output I/F 116 illustrated in FIG. 3. After the voice of the user is converted to a sound signal by the microphone 114, the sound input unit 15a receives sound data according to this sound signal. The sound output unit 15b is realized by a command from the CPU 101 illustrated in FIG. 3 and by the sound input/output I/F 116 illustrated in FIG. 3, and outputs the sound signal according to the sound data to the speaker 115, and the speaker 115 outputs sound.

The display control 16 is realized by a command from the CPU 101 illustrated in FIG. 3 and by the display I/F 117 illustrated in FIG. 3, and performs control for transmitting image data to the external display 120.

In addition, the data processor 19 is realized by a command from the CPU 101 illustrated in FIG. 3 and by the SSD 105 illustrated in FIG. 3, and performs processing to store various types of data in the memory 1000 or to read various types of data stored in the memory 1000. The memory 1000 stores a terminal identification (ID) serving as an example of identification information for identifying the terminal 10, a password, and the like. In addition, every time image data and sound data that are received in performing communication with a counterpart terminal are received, the image data and sound data are overwritten in the memory 1000. Among these items of data, on the basis of image data before being overwritten, an image is displayed on the display 120, and, on the basis of sound data before being overwritten, sound is output from the speaker 115.

Note that, in the embodiment, an ID such as a terminal ID or a later-described relay device ID indicates identification information such as a language, a character(s), a symbol(s), or various marks used to uniquely identify a corresponding terminal 10 or relay device 30. In addition, a terminal ID and a relay device ID may be identification information including a combination of at least two of the above-mentioned language, character(s), symbol(s), and various marks.

<Functional Configuration of Management System>

The management system 50 includes a data transmitter/receiver 51, an authenticator 52, a terminal manager 53, an extractor 54, a counterpart terminal determiner 55, a name determiner 56, a candidate list manager 57, a share request manager 58, a group information manager 60, and a data processor 59. These portions are functions that are realized by or portions that are caused to function by any of the elements illustrated in FIG. 4 that is/are caused to operate in response to a command from the CPU 201 in accordance with the management system program expanded from the HD 204 to the RAM 203. In addition, the management system 50 includes a memory 5000 that stores various types of data (or information), and the memory 5000 is configured by the HD 204 illustrated in FIG. 4.

(Authentication Management Table)

The memory 5000 stores an authentication management DB 5001, which may be implemented by an authentication management table such as that illustrated in FIG. 6. FIG. 6 is a conceptual diagram illustrating an authentication management table. The authentication management table manages a password associated with each of terminal IDs of all terminals 10 managed by the management system 50. For example, the authentication management table illustrated in FIG. 6 indicates that the terminal ID of the terminal 10aa is "01aa", and the password of the terminal 10aa is "aaaa".

(Terminal Management Table)

Also in the memory 5000, a terminal management DB 5002 configured by a terminal management table such as that illustrated in FIG. 7 is stored. FIG. 7 is a conceptual diagram illustrating a terminal management table. The terminal management table manages, for each of the terminal IDs of terminals 10, the name, operation state, and IP address thereof that are associated with one another. For example, the terminal management table illustrated in FIG. 7 indicates that the name of the terminal 10aa whose terminal ID is "01aa" is "group a, branch a, company X", the operation state thereof is "online", and the IP address thereof is "1.2.1.3".

(Candidate List Management Table)

Further in the memory 5000, a candidate list management DB 5003 configured by a candidate list management table such as that illustrated in FIG. 8 is stored. FIG. 8 is a conceptual diagram illustrating a candidate list management table. The candidate list management table manages a terminal ID for identifying a terminal 10 serving as a starting terminal, a terminal ID for identifying a terminal 10 serving as a candidate counterpart terminal capable of communicating with the terminal 10 serving as the starting terminal, and the name of the candidate counterpart terminal usable by the terminal 10 serving as the starting terminal, which are associated with one another. The fact that the name of the candidate counterpart terminal is usable by the terminal 10 serving as the starting terminal indicates that the terminal 10 serving as the starting terminal can be notified of the name of this candidate counterpart terminal. The candidate list management table manages the terminal IDs of all terminals 10 registered as candidate counterpart terminals that are associated with the terminal ID of a terminal 10 serving as a starting terminal in communication in a video conference. For example, the candidate list management table illustrated in FIG. 8 indicates that candidate counterpart terminals to which the terminal 10aa serving as a starting terminal, whose terminal ID is "01aa", can give a communication start request for a video conference are the terminal 10ac whose terminal ID is "01ac", the terminal 10ad whose terminal ID is "01ad", and the like. In addition, the candidate list management table also indicates that the name of the terminal 10ac that can be reported to the terminal 10aa is "Mr. c". The candidate counterpart terminals are updated by addition or deletion in response to an addition or deletion request from the terminal 10 to the management system 50.

(Group Information Management DB)

Also in the memory 5000, a group information management DB 5101 configured by a group information management table such as that illustrated in FIG. 9 is stored. FIG. 9 is a conceptual diagram illustrating a group information management table. The group information management table manages group information including a group name, a group ID, the terminal ID of each member terminal, the terminal ID of an owner terminal, and the terminal ID of a user terminal, which are associated with one another. A group name is the name of a certain group. A group ID is identification information for identifying a group. The terminal ID of each member terminal is a terminal ID for identifying the terminal of each candidate counterpart terminal (member terminal) included in a group. The terminal ID of an owner terminal is a terminal ID for identifying a terminal 10 (owner terminal) that can give a request for sharing a candidate list of one or more member terminals. The terminal ID of a user terminal is a terminal ID for identifying a terminal 10 (user terminal) that can request to communicate with a member terminal as a candidate counterpart terminal, besides an owner terminal.

In the group information management table illustrated in FIG. 9, the group name of a group identified by the group ID "0002" is "regular team". The member terminals of this group are the terminal 10ac identified by the terminal ID "01ac" and the terminal 10ae identified by the terminal ID "01ae". In addition, the owner terminal of this group is the terminal 10ac, and the user terminal is 10ae.

(Share Request Management Table)

Further in the memory 5000, a share request management DB 5102 configured by a share request management table such as that illustrated in FIG. 10 is stored. FIG. 10 is a conceptual diagram illustrating a share request management table. The share request management table manages the terminal ID of a share request sender, the terminal ID of a share request destination, a group ID, and the terminal ID of each member terminal serving as a share target, which are associated with one another. The terminal ID of a share request sender is, in the case where a certain terminal 10 selects a counterpart terminal, a terminal ID for identifying a terminal 10 that gives a request for sharing a candidate list of one or more member terminals included in the above-mentioned group. The terminal ID of a share request destination is a terminal ID for identifying a terminal 10 serving as a share request destination. The terminal ID of each member terminal serving as a share target in the share request management table is managed in such a manner that it is possible to distinguish between whether only a counterpart terminal(s) is/are to be shared or a counterpart terminal(s) and the name(s) of the counterpart terminal(s) usable by the share request sender (entire information) are to be shared.

(Functional Configuration of Management System)

Next, functional configuration of the management system 50 will be described in detail. Note that, in the following description of functional configuration of the management system 50, among elements illustrated in FIG. 4, relationships with main elements for realizing functional configuration of the management system 50 will also be described.

The data transmitter/receiver 51 is realized by a command from the CPU 201 illustrated in FIG. 4 and by the network I/F 209 illustrated in FIG. 4, and performs transmission/reception of various types of data (or information) to/from another terminal, apparatus, or system via the communication network 2.

The authenticator 52 is realized by a command from the CPU 201 illustrated in FIG. 4, and performs authentication by searching the authentication management DB 5001 of the memory 5000 by using a terminal ID and a password included in login request information received via the data transmitter/receiver 51 as search keys and determining whether the same pair of a terminal ID and a password is managed in the authentication management DB 5001.

The terminal manager 53 is realized by a command from the CPU 201 illustrated in FIG. 4. In order to manage the operation state of a terminal 10 which has given a login request, the terminal manager 53 stores and manages the terminal ID, operation state, and IP address of the terminal in association with one another in the terminal management DB 5002 (see FIG. 7). In addition, on the basis of operation state information sent from the terminal 10 indicating that power is turned off when the power switch 109 of the terminal 10 is turned from on to off, the terminal manager 53 changes the operation state indicating an online state to an offline state in the terminal management DB 5002 (see FIG. 7).

The extractor 54 is realized by a command from the CPU 201 illustrated in FIG. 4, and extracts various types of information stored in the memory 5000. In addition, the extractor 54 extracts, from the group information management table (see FIG. 9), the terminal ID of each member terminal associated with a group ID accepted by the data transmitter/receiver 51. Further, the extractor 54 search the candidate list management table (see FIG. 8) by using the terminal ID of a terminal 10 serving as a starting terminal that has given a login request as a key and reads the terminal ID of a terminal 10 serving as a candidate counterpart terminal with which the terminal 10 serving as the starting terminal can communicate, thereby extracting the terminal ID. In addition, the extractor 54 searches the terminal management table (see FIG. 7) by using the terminal ID of a candidate counterpart terminal extracted by the extractor 54 as a search key, and reads the operation state for each terminal ID extracted by the extractor 54. Accordingly, the extractor 54 can obtain the operation state of a candidate counterpart terminal that can communicate with a starting terminal that has given a login request.

The counterpart terminal determiner 55 determines whether a terminal ID for identifying a member terminal as a candidate counterpart terminal is managed, in the candidate list management table (see FIG. 8), in association with a terminal ID for identifying a starting terminal for certain communication.

The name determiner 56 determines a name to be displayed at a share destination ("display name"), of a counterpart terminal serving as a share target.

The candidate list manager 57 is realized by a command from the CPU 201 illustrated in FIG. 4, and adds or deletes the terminal ID of a counterpart terminal, for each of the terminal IDs of starting terminals in the candidate list management DB 5003 (see FIG. 8).

The share request manager 58 is realized by a command from the CPU 201 illustrated in FIG. 4, and, for each record in the share request management DB 5102 (see FIG. 10), stores and manages various types of information such as the terminal ID of a share request sender and the terminal ID of a share request destination. In addition, for each record, the share request manager 58 deletes various types of information such as the terminal ID of a share request sender and the terminal ID of a share request destination.

The group information manager 60 is realized by a command from the CPU 201 illustrated in FIG. 4, and, for each record in the group information management table (see FIG. 9), stores and manages various types of information, such as a group name, a group ID, and the terminal IDs of each member terminal, an owner terminal, and a user terminal. For each record in the group information management table (see FIG. 9), the group information manager 60 deletes various types of information such as a group name, a group ID, and the terminal IDs of each member terminal, an owner terminal, and a user terminal.

The data processor 59 is executed by a command from the CPU 201 illustrated in FIG. 4 and the HDD 205 illustrated in FIG. 4, and performs processing to store various types of data in the memory 5000 or read various types of data stored in the memory 5000.

<<Process or Operation>>

First, using FIG. 11, the overall process and operation of the management system 50 and the terminal 10 will be described. FIG. 11 is a conceptual diagram illustrating a transmission/reception state of various types of information in the communication system 1.

The candidate list management DB 5003 of the management system 50 manages the terminal ID of a terminal 10 serving as a starting terminal, the terminal ID of a terminal 10 serving as a candidate counterpart terminal, and the name of the candidate counterpart terminal that is individually set by a user who operates the terminal 10, in association with one another. The terminal management DB 5002 manages the terminal ID of a terminal 10 and the name of the terminal 10 that is set by default ("preset name"), in association with each other. The preset name of the terminal 10 is previously set, for example, by the administrator of the system for use by all of the terminals 10. The data transmitter/receiver 51 of the management system 50 receives a group information sharing request from the terminal 10aa to the terminal 10ac, which requests to share a member terminal in a specific group with the terminal 10ac. The data transmitter/receiver 51 receives, from the terminal 10aa, information indicating permission or rejection of sharing of the name of a counterpart terminal individually set by the user of the terminal 10aa. In the case where information indicating permission of the sharing of the name is received by the data transmitter/receiver 51, the data transmitter/receiver 51 transmits, to the terminal 10ac, the name of a candidate counterpart terminal, which is managed in the candidate list management DB 5003 in association with the terminal ID of the terminal 10aa and the terminal ID of the candidate counterpart terminal, that is, the member terminal of the group. In the case where information indicating rejection of the sharing of the name is received by the data transmitter/receiver 51, the data transmitter/receiver 51 transmits, to the terminal 10ac, the name of a candidate counterpart terminal, which is managed in the terminal management DB 5002 in association with the terminal ID of the terminal 10, that is, a member terminal of the group. Accordingly, in the case where secret information is set as the name of a candidate counterpart terminal individually set by the user of the terminal 10aa, the user can prevent the secret information from being transmitted to the terminal 10ac, while still allowing for the terminal 10ac to distinguish the candidate counterpart terminal on the basis of the name of the candidate counterpart terminal managed in the terminal management DB 5002.

In the candidate list management DB 5003, in the case where the terminal ID of the terminal 10ac, the terminal ID of the candidate counterpart terminal (member terminal of the group), and the name of the candidate counterpart terminal individually set by the user of the terminal 10ac are managed in association with one another, the data transmitter/receiver 51 transmits the name of the counterpart terminal set by the terminal 10ac to the terminal 10ac, regardless of the details of the information accepted by the data transmitter/receiver 51. Accordingly, it becomes easier for the terminal 10ac to distinguish the member terminal (candidate counterpart terminal), as the name set by the user of the terminal 10ac is being displayed.

In the candidate list management DB 5003, in the case where the terminal ID of the terminal 10ac and the terminal ID of the member terminal are not managed in association with each other, the candidate list manager 57 updates the candidate list management DB 5003 so that the terminal ID of the terminal 10ac and the terminal ID of the member terminal are managed in association with each other. Accordingly, the terminal 10ac can communicate with the member terminal 10, which serves as a candidate counterpart terminal.

In the case where notification information indicating permission of the notification is accepted by the data transmitter/receiver 51, the candidate list manager 57 updates the candidate list management DB 5003 so that the terminal ID of the terminal 10ac, the terminal ID of the member terminal, and the name of the candidate counterpart terminal individually set by the user of the terminal 10aa will be managed in association with one another. Accordingly, the user at the terminal 10ac is exempted from setting the name of a counterpart terminal of the member terminal 10.

In alternative to or in addition to the name of a candidate counterpart terminal, the candidate list management DB 5003 and the terminal management DB 5002 may manage an attribute or a property such as an organization to which a candidate counterpart terminal belongs, a picture of a user who operates the candidate counterpart terminal, a device type of the candidate counterpart terminal, and any other information that may be associated with the candidate counterpart terminal such as memo input by the user who registers the candidate counterpart terminal.

The operation input acceptor 12 of the terminal 10aa accepts an input of a request for the terminal 10ac for sharing group information. In addition, the operation input acceptor 12 accepts an input of permission or rejection of notification of the name of a counterpart terminal individually set by the user of the terminal 10aa. The data transmitter/receiver 11 of the terminal 10aa transmits, to the management system 50, the above-mentioned request and notification information indicating permission or rejection.

Figure 12:
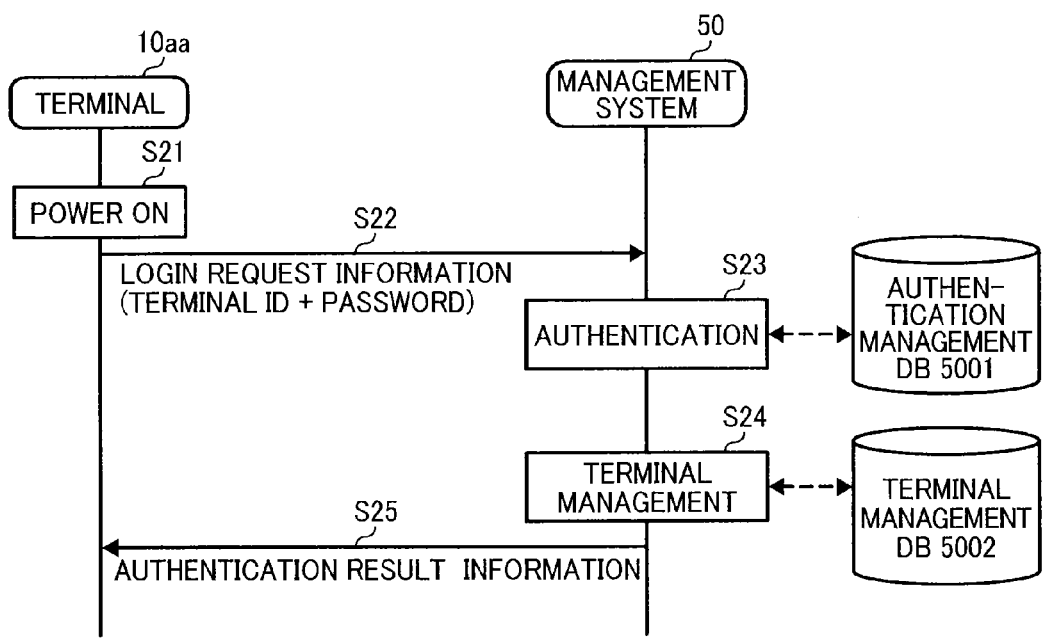
FIG. 12 is a sequence diagram illustrating example operation of logging in to the management system.

Next, each process discussed above as the overview will be described more specifically by discussing a series of processes of the embodiment using FIGS. 12 to 24. First, using FIG. 12, a process of the terminal 10 logging in to the management system 50 will be described. FIG. 12 is a sequence diagram illustrating a process of logging in to the management system 50.

First, when the user of the terminal 10aa turns on the power switch 109 illustrated in FIG. 3, the operation input acceptor 12 illustrated in FIG. 5 accepts the power on operation and turns on the power (step S21). In response to acceptance of the power on operation, the login requester 13 automatically transmits login request information indicating a login request from the data transmitter/receiver 11 to the management system 50 via the communication network 2 (step S22). The login request information includes a terminal ID for identifying the terminal 10aa, which serves as a request sender, and a password. The terminal ID and the password are data that have been read via the data processor 19 from the memory 1000 and sent to the data transmitter/receiver 11. In the case of transmitting login request information from the terminal 10aa to the management system 50, the management system 50, which is a receiving side, can detect the IP address of the terminal 10aa, which is a transmitting side.

Next, the authenticator 52 of the management system 50 performs authentication by searching the authentication management table (see FIG. 6) of the memory 5000 by using the terminal ID and the password included in the login request information received via the data transmitter/receiver 51 as search keys, and determining whether the same terminal ID and the same password are managed in the authentication management DB 5001 (step S23). In the case where the authenticator 52 determines that the login request is a login request from a terminal 10 that has a legitimate use authority since the same terminal ID and the same password are managed, the terminal manager 53 stores the operation state and the IP address of the terminal 10aa in association with each other in each record indicated by the terminal ID and the counterpart terminal name of the terminal 10aa in the terminal management DB 5002 (see FIG. 7) (step S24). Accordingly, the operation state "online" and the IP address "1.2.1.3" are managed in association with the terminal ID "01aa" in the terminal management table illustrated in FIG. 4.

The data transmitter/receiver 51 of the management system 50 transmits authentication result information indicating an authentication result obtained by the authenticator 52 to the terminal 10aa, which has given the above-mentioned login request, via the communication network 2 (step S25). In the embodiment, the case in which it has been determined by the authenticator 52 that the terminal 10aa is a terminal that has a legitimate use authority will be continuously described as follows.

Figure 13:
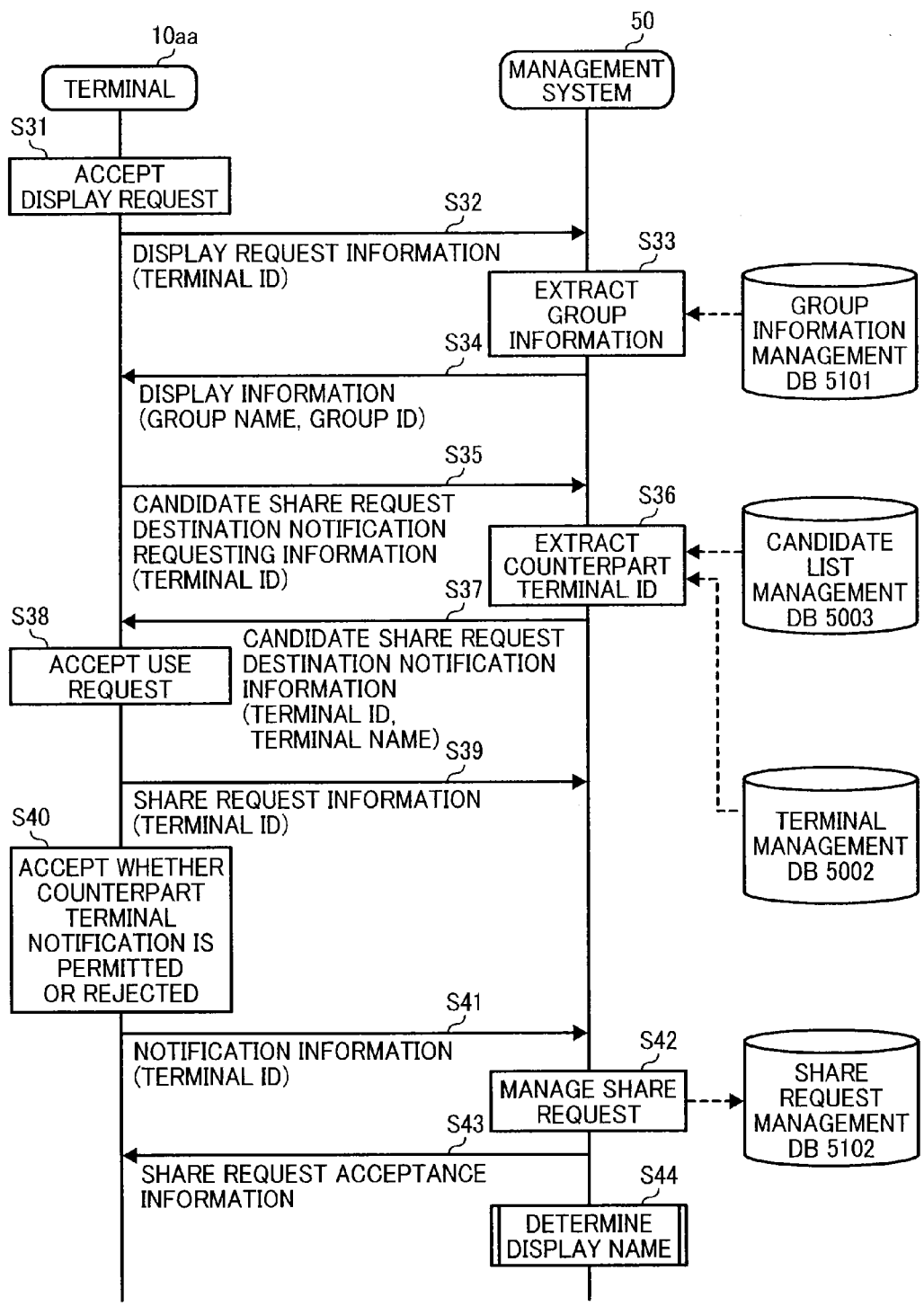
FIG. 13 is a sequence diagram illustrating example operation of requesting to share a list of candidate counterpart terminals.

Next, using FIG. 13, a process of giving a request to share, with the terminal 10ac, a candidate list of a group identified by the group ID "0001" will be described. FIG. 13 is a sequence diagram illustrating a candidate counterpart terminal share requesting process. First, the operation input acceptor 12 of the terminal 10aa accepts, on the basis of an operation of the operation key(s) 108, a request for displaying the group name of a group whose owner terminal is the terminal 10aa (step S31). In response to acceptance of this display request, the data transmitter/receiver 11 transmits, to the management system 50 via the communication network 2, display request information indicating the above-mentioned display request, along with the terminal ID "01aa" of the terminal 10aa (step S32).

In response to acceptance of the display request information by the data transmitter/receiver 51 of the management system 50, the extractor 54 searches for a record of the terminal ID of the owner terminal in the group information management table (see FIG. 9) by using the terminal ID "01aa" included in the display request information as a search key. Accordingly, the corresponding group name "project A" and the group ID "0001" are read and extracted (step S33). Next, the data transmitter/receiver 51 transmits display information including the extracted group name and group ID to the terminal 10aa via the communication network 2 (step S34).

In response to acceptance of the display information by the data transmitter/receiver 11 of the terminal 10aa, the display control 16 generates, on the basis of the display information, a display screen indicating the group name of the group whose owner terminal is the terminal 10aa, and outputs the display screen to the display 120 illustrated in FIG. 3 (see FIG. 14). Note that FIG. 14 is a schematic diagram illustrating an example of a group name display screen. In response to selection of a "share request button" on the display screen on the basis of an operation of the operation key(s) 108, the operation input acceptor 12 accepts an input of a request for sharing a candidate list of the displayed group. Next, the data transmitter/receiver 11 transmits, to the management system 50 via the communication network 2, candidate share request destination notification requesting information that includes the terminal ID of the terminal 10aa and requests notification of a candidate share request destination (step S35).

In response to acceptance of the candidate share request destination notification requesting information by the data transmitter/receiver 51 of the management system 50, the extractor 54 searches the candidate list management table (see FIG. 8) by using the terminal ID "01aa" included in the candidate share request destination notification requesting information as a search key, and extracts the terminal ID and name of a candidate counterpart terminal that can be specified by the terminal 10aa as a counterpart terminal. Here, the terminal IDs ("01ac", "01ad", . . . ) of terminals (10ac, 10ad, . . . ) serving as candidate counterpart terminals corresponding to the terminal ID "01aa" of the terminal 10aa, and the names ("Mr. c", "Mr. d, general manager", . . . ) corresponding thereto are extracted. Although an example in which the candidate counterpart terminal(s) of the terminal 10aa is/are extracted as a candidate share request destination(s) is described in the embodiment, instead of the candidate counterpart terminal(s) of the terminal 10aa, the member terminal(s) of the group may be extracted as a candidate share request destination(s). In this case, the extractor 54 searches the group information management DB 5101 by using the terminal ID "01aa" as a search key, thereby extracting the terminal ID of a corresponding member terminal. Next, the data transmitter/receiver 51 of the management system 50 transmits the candidate share request destination notification information including the extracted terminal ID(s) and terminal name(s) to the terminal 10aa (step S37).

In response to acceptance of the candidate share request destination notification information by the data transmitter/receiver 11 of the terminal 10aa, the display control 16 generates a display screen indicating the terminal ID(s) and terminal name(s) included in the candidate share request destination notification information, and outputs the display screen to the display 120 illustrated in FIG. 3 (see FIG. 15). Note that FIG. 15 is a schematic diagram illustrating an example of a share request destination selection acceptance screen. When the check box of the name "Mr. c" on the display screen is selected by an operation of the operation key(s) 108, the operation input acceptor 12 accepts an input of a request for sharing the group's candidate list with the terminal 10ac (step S38).

Next, the data transmitter/receiver 11 transmits, to the management system 50 via the communication network 2, share request information that includes the terminal ID "01aa" of the share request sender and the terminal ID "01ac" of the share request destination and indicates a request for sharing the group's candidate list (step S39).

Next, the display control 16 generates a display screen for causing the selected share destination to select sharing only a counterpart terminal of a member terminal of the group or sharing a counterpart terminal and a display name, and outputs the display screen to the display 120 (see FIG. 16). Note that FIG. 16 is an illustration of an example share details confirmation screen. The operation input acceptor 12 accepts, on the basis of an operation of the operation key(s) 108, an input of whether permission or rejection of notification of the name of a counterpart terminal usable by the terminal 10aa (step S40). In the case where "share only counterpart terminal(s)" is selected on the display screen illustrated in FIG. 16, the operation input acceptor 12 accepts an input of rejection of notification of the name of a counterpart terminal usable by the terminal 10aa, and, in the case where "share counterpart terminal(s) and name(s)" is selected, the operation input acceptor 12 accepts an input of permission of notification of the name of a counterpart terminal. In addition, in the case where none of these choices is selected, the operation input acceptor 12 accepts a request indicating that an unselected counterpart terminal is not to be shared.

Next, the data transmitter/receiver 11 transmits, to the management system 50 via the communication network 2, the terminal IDs "01ad, 01ae, and 01ag" of member terminals serving as share targets among the member terminals of the group, and items of notification information "permission, rejection, and rejection" each indicating permission or rejection of notification of the name of a counterpart terminal, which are associated (step S41).

In response to acceptance of the notification information by the data transmitter/receiver 51 of the management system 50, the share request manager 58 registers the terminal ID "01aa" of the share request sender, the terminal ID "01ac" of the share request destination, and the terminal ID(s) of a member terminal(s) serving as a share target(s), which are included in the share request information, in association with one another in the share request management table (see FIG. 10) (step S42). In the case of registration of each member terminal ID, the share request manager 58 registers, on the basis of the notification information, the terminal ID in such a manner that whether entire information including the name of a counterpart terminal is to be shared or only a counterpart terminal is to be shared is distinguishable, for each member terminal ID. In response to completion of the registration of various types of information in the share request management table, the data transmitter/receiver 51 transmits, to the terminal 10aa, share request acceptance information indicating that the share request has been accepted (step S43).

Figure 17:
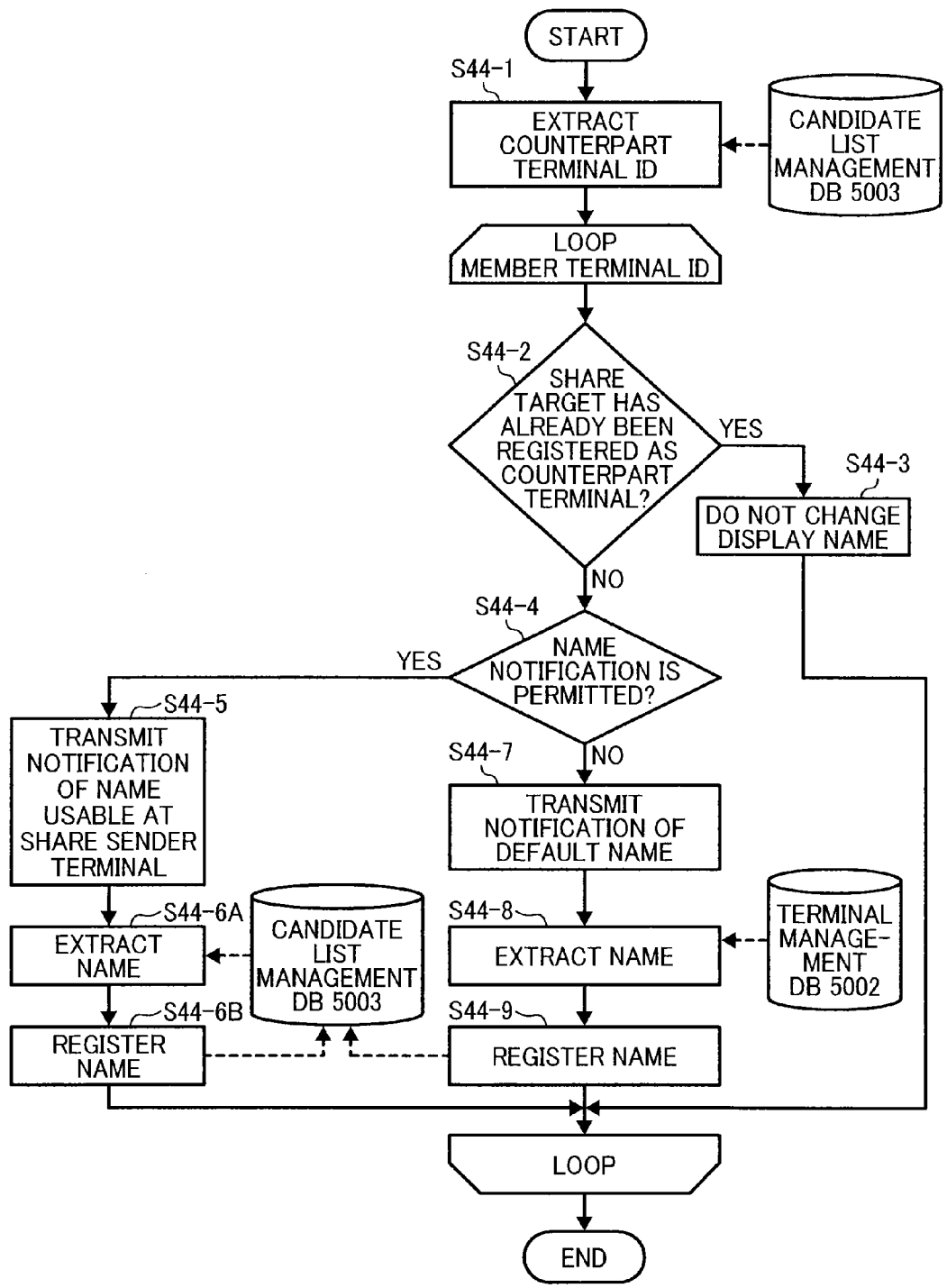
FIG. 17 is a flowchart illustrating example operation of determining the display name, at a share destination, of a member serving as a share target.

Next, the name determiner 56 of the management system 50 determines the display name, at a share destination, of a member terminal serving as a share target (step S44). Using FIG. 17, a process of determining the display name, at a share destination, of a member terminal serving as a share target will be described. Note that FIG. 17 is a flowchart illustrating a process of determining the display name, at a share destination, of a member terminal serving as a share target.

First, the extractor 54 searches the candidate list management table (see FIG. 8) by using the terminal ID "01ac" of the share request destination included in the share request information as a search key, thereby reading and thus extracting the terminal IDs "01ae, . . . " of terminals 10 serving as candidate counterpart terminals that can be requested by the terminal 10ac to start communication (step S44-1).

Next, the counterpart terminal determiner 55 determines, for each member terminal serving as a share target registered in association with the terminal ID "01ac" of the share request destination (see FIG. 10), whether that member terminal ID is registered in the candidate list management table as a candidate counterpart terminal for the terminal 10ac (step S44-2). In this case, if the member terminal ID is included in the terminal IDs of candidate counterpart terminals extracted by the extractor 54, it is determined that the member terminal ID is registered as a specifiable candidate counterpart terminal; if not, it is determined that the member terminal ID is unregistered as a specifiable candidate counterpart terminal. In this example, it is determined that the terminal ID "01ae" of a member terminal serving as a share target is registered as a candidate counterpart terminal for the terminal 10ac, and the terminal IDs "01ad, 01af, and 01ag" are unregistered as candidate counterpart terminals for the terminal 10ac.

In the case where the terminal ID of each member terminal serving as a share target is registered as the terminal ID of a candidate counterpart terminal for the terminal 10ac (YES in step S44-2), the name determiner 56 determines not to change the name of that member terminal serving as a share target (step S44-3). That is, since the terminal ID "01ae" of a member serving as a share target is registered as the terminal ID of a candidate counterpart terminal that can be requested by the terminal 10ac, the name of that member terminal (terminal 10ae) which is usable by the terminal 10ac remains unchanged as "Mr. e" (see FIG. 8).

In the case where the terminal ID of each member terminal serving as a share target is not registered as the terminal ID of a candidate counterpart terminal that can be requested by the terminal 10ac (NO in step S44-2), the name determiner 56 determines, for each member terminal serving as a share target, whether notification information indicating permission of notification of the name of a counterpart terminal that can be used by the terminal 10aa has been accepted (step S44-4). In the case where notification information indicating permission of the notification has been accepted (YES in step S44-4), the name determiner 56 determines to notify the terminal 10ac, which is the share request destination, of the name that can be used by the terminal 10aa (step S44-5). In this example, for a member terminal serving as a share target, whose terminal ID is "Glad", notification information indicating permission of notification of the name of a counterpart terminal has been accepted (see FIGS. 10 and 16). In this case, the extractor 54 extracts the name "Mr. d, general manager", which is managed in association with the terminal ID "01aa" of the share request sender and with the terminal ID "01ad" of the member terminal in the candidate list management table (see FIG. 8) (step S44-6A). Further, the candidate list manager 57 updates the candidate list management table by recording the extracted name "Mr. d, general manager" in association with the terminal ID "01ac" of the share request destination and with the terminal ID "01ad" of the member terminal (step S44-6B).

In the case where notification information indicating rejection of notification of the name of a counterpart terminal has been accepted (NO in step S44-4), the name determiner 56 determines to notify the terminal 10ac, which is the share request destination, of a preset name (step S44-7). In this example, for a member terminal serving as a share target, whose terminal ID is "01ag", notification information indicating rejection of notification of the name of a counterpart terminal has been accepted (see FIGS. 10 and 16). In this case, the extractor 54 extracts the name "group g, branch a, company X", which is managed in association with the terminal ID "01ag" of the member terminal in the terminal management table (see FIG. 7) (step S44-8). Further, the candidate list manager 57 updates the candidate list management table by recording the extracted name "group g, branch a, company X" in association with the terminal ID "01ac" of the share request destination and with the terminal ID "01ag" of the member terminal (step S44-9).

Next, using FIG. 18, a process of accepting, at a share request destination, a request for sharing a group's candidate list will be described. Note that FIG. 18 is a sequence diagram illustrating a share request acceptance process. Here, the description will be continuously given while assuming that the terminal 10ac serving as a share request destination has completed a process of logging in to the management system 50 by performing a process that is the same as or similar to that in steps S21 to S25 of FIG. 12.

First, the data transmitter/receiver 11 of the terminal 10ac transmits share request confirmation information indicating confirmation of the presence of a request for sharing a candidate counterpart terminal, along with the terminal ID "01ac" of the terminal 10ac, to the management system 50 via the communication network 2 (step S51).

In response to acceptance of the share request confirmation information by the data transmitter/receiver 51 of the management system 50, the share request manager 58 searches the share request management table (see FIG. 10) for the terminal ID of a share request destination by using the terminal ID "01ac" included in the share request confirmation information as a search key, thereby reading and thus extracting the terminal ID "01aa" of the corresponding share request sender and the group ID "0001" (step S52). In addition, the extractor 54 searches the group information management table (see FIG. 9) by using the group ID "0001" as a search key, thereby reading and thus extracting the group name "Project A" of the corresponding group. Accordingly, the data transmitter/receiver 51 transmits share request confirmation result information including the extracted terminal ID of the share request sender, group ID, and group name to the terminal 10ac (step S53).

In response to acceptance of the share request confirmation result information by the data transmitter/receiver 11 of the terminal 10ac, the display control 16 generates, on the basis of the share request confirmation result information, a share request notification screen, and outputs the share request notification screen to the display 120 illustrated in FIG. 3 (see FIG. 19). Note that FIG. 19 is a schematic diagram illustrating an example of a share request notification screen. In the case of selection of a "member information request" button on the share request notification screen on the basis of an operation of the operation key(s) 108, the operation input acceptor 12 accepts an input of a request for member information of the reported group. Next, the data transmitter/receiver 11 transmits, to the management system 50 via the communication network 2, member information request information that includes the terminal ID of the terminal 10ac and the group ID and that indicates that a member terminal of the group is to be used as a candidate counterpart terminal (step S54).

In response to acceptance of the member information request information by the data transmitter/receiver 51 of the management system 50, the extractor 54 searches the candidate list management table (see FIG. 8) by using the terminal ID "01ac" of the terminal 10ac serving as the share request destination and the terminal ID of each member serving as a share target as search keys, thereby extracting a corresponding name (step S55). Accordingly, the data transmitter/receiver 51 transmits, to the terminal 10ac, group member information in which the terminal ID and name of a member serving as a share target are associated with each other (step S56). In the case where the name of a candidate counterpart terminal that can be used by the terminal 10ac is updated in step S44-6B or S44-9, the terminal 10ac is notified of the updated name.

Figures 20, 21:
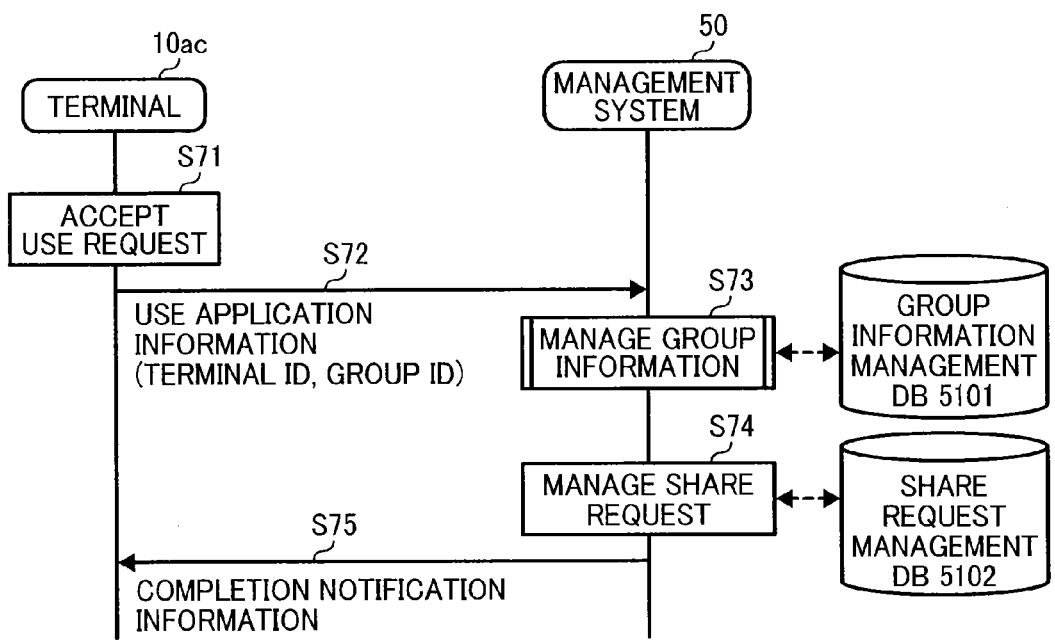
FIG. 20 is an example illustration of a member display screen.
FIG. 21 is a sequence diagram illustrating example operation of processing a group information use request.

In response to acceptance of the group member information by the data transmitter/receiver 11 of the terminal 10ac, the display control 16 generates, on the basis of the group member information, a screen including a member list, and outputs the screen to the display 120 illustrated in FIG. 3 (FIG. 20) (step S57). FIG. 20 is a schematic diagram illustrating an example of a member display screen.

Next, a process of applying to use group information will be described using FIG. 21. FIG. 21 is a sequence diagram illustrating a group information use application process. In response to selection of a "use" button on the member display screen illustrated in FIG. 20 on the basis of an operation of the operation key(s) 108, the operation input acceptor 12 accepts a request for using a candidate list of a reported group (step S71). In response to acceptance of the use request, use application information that includes the terminal ID of the terminal 10ac, the terminal ID of each member serving as a share target, and the group ID of a group whose information is to be used, and that indicates application to use group information, is transmitted to the management system 50 (step S72).

Figures 22, 23, 24:
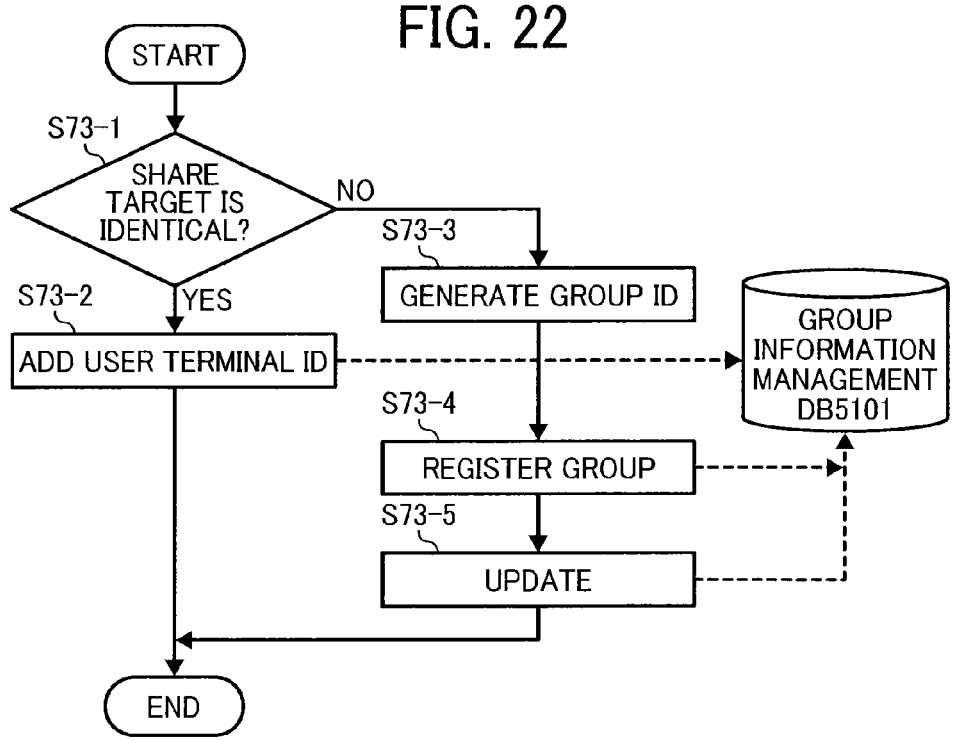
FIG. 22 is a flowchart illustrating example operation of updating group information.
FIG. 23 is a conceptual diagram illustrating an updated group information management table.
FIG. 24 is a conceptual diagram illustrating an updated group information management table.

In response to acceptance of the use application information by the data transmitter/receiver 51 of the management system 50, the group information manager 60 updates the group information management table (see FIG. 9) on the basis of various types of information included in the use application information (step S73). This process will be described using FIG. 22. FIG. 22 is a flowchart illustrating a process of updating group information. The group information manager 60 determines whether a member of a group identified by the group ID included in the use application information accepted by the data transmitter/receiver 51 is identical to a member serving as a share target (step S73-1). In the embodiment, among members of a group identified by the group ID "0001" (see FIG. 9), a member identified by the terminal ID "01af" does not serve as a share target (see FIGS. 10 and 16), and hence it is determined that the member of the identified group is not identical to a member serving as a share target (NO in step S73-1). In this case, the group information manager 60 newly generates the group ID "0003" for uniquely identifying a group (step S73-3). Next, the group information manager 60 registers, in association with the generated group ID "0003", the terminal ID "01ac" of the terminal 10ac, which is the applicant, as the owner terminal ID in the group information management table (see FIG. 9) (step S73-4). Next, the group information manager 60 updates the group information management table by registering the group name "Project A" and the terminal IDs "01ad, 01ae, and 01ag" of member terminals serving as share targets in association with the group ID "0003" in the group information management table (see FIG. 23) (step S73-5). Note that FIG. 23 is a conceptual diagram illustrating the updated group information management table.

In the case where the member of the identified group is identical to a member serving as a share target (YES in step S73-1), the group information manager 60 adds the terminal ID "01ac" of the terminal 10ac, which is the applicant, to a field of a user ID associated with the group ID "0001" in the group information management table (see FIG. 9), thereby updating the group information management table (see FIG. 24) (step S73-2). Note that FIG. 24 is a conceptual diagram illustrating the updated group information management table.

In response to completion of the updating of the group information, the share request manager 58 deletes each record including the terminal ID "01ac" of the applicant as the terminal ID of the share request destination in the share request management table (see FIG. 10), thereby updating the share request management table (step S74). In response to completion of the updating of the share request management table, completion notification information indicating completion of the process based on the group information use application is transmitted to the terminal 10ac (step S75).

In response to completion of the process of sharing group information, the terminal 10ac serving as the share destination can select an arbitrary candidate counterpart terminal included in the group's candidate list and give a communication start request to the management system 50. In response to reception of the start request, the management system 50 controls connection between the terminals 10 by a process performed by the CPU 201. Accordingly, a session for transmitting and receiving each of image data and sound data via the relay device 30 is established between the terminals 10. A method of establishing a session between the terminal 10ac and the terminal 10 of an arbitrary candidate counterpart terminal is not particularly limited. The terminal 10ac and the counterpart terminal 10 establish a communication session through the relay device 30 to transmit or receive various data such as image data and sound data, using any desired method, for example, as described in the description related to FIGS. 2 and 3A to 3C of U.S. Patent Application Publication No. 2013-0223292, the contents of which is incorporated herein by reference.

As described above, in one embodiment, since the system transmits counterpart terminal related information individually set by a user of a first terminal, to a second terminal, in response to information indicating sharing of the counterpart terminal related information is permitted. If sharing of the counterpart terminal related information is rejected, the system transmits, to the second terminal, terminal related information that is set by default. In this manner, in the case where the counterpart terminal related information includes any secret information, such information is prevented from being disclosed to the second terminal, while still allowing the user of the second terminal to distinguish the candidate counterpart terminal using the terminal related information that is set by default.

More specifically, secret information such as a project name or an alias such as a nickname may be registered as related information of a candidate counterpart terminal in a candidate list. In such a case, if a destination is notified of a candidate list, a problem may occur such that secret information is disclosed to the destination, or it becomes impossible to distinguish a candidate counterpart terminal if such information does not convey any meeting to a user who shares.

The relay devices 30, the management system 50, the program providing system 90, and the maintenance system 100 in the above-described embodiment may be configured by a single computer or a plurality of computers to which divided portions (functions) are arbitrarily allocated. As the management system 50 configured by a plurality of computers, a configuration that includes a management apparatus and a web application server is given by way of example. In this case, the management apparatus includes, for example, the candidate list management DB 5003. The web application server provides a web application to a terminal 10, and outputs a command to update a candidate list to the management apparatus on the basis of a request accepted by the web application. In this case, the web application server includes, for example, the candidate list management DB 5003 of the management system 50 illustrated in FIG. 5. Note that the management apparatus and the web application server may be located in one and the same country or in different countries.

In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

Although it has been described in the embodiment that a request to share group information is given using a terminal 10 for a videoconference, the embodiment is not limited to this case. Instead of a terminal 10, a request to share group information may be given using an information processing apparatus such as a personal computer. In this case, the information processing apparatus has the functional configuration of the terminal 10 illustrated in FIG. 5.

Although terminal IDs are used as identification information for identifying a request sender, a candidate counterpart terminal, a member terminal, an owner terminal, a user terminal, and the like in the above-described embodiment, the embodiment is not limited to this case. Terminal IDs may be replaced by user IDs for identifying the users of terminals 10. In this case, terminal IDs for identifying the terminals 10 of a request sender, a candidate counterpart terminal, a member terminal, an owner terminal, a user terminal, and the like are replaced by user IDs for identifying a request sender, a candidate counterpart terminal, a member, an owner, a user, and the like.

Although it has been described in the embodiment that a terminal ID for identifying a counterpart terminal 10 that can be specified by a terminal 10 at a request sender side is managed in the counterpart management table (see FIG. 8), the embodiment is not particularly limited to this case. A terminal ID for identifying a counterpart terminal 10 may be replaced by the phone number of a counterpart terminal 10 that can be selected by a terminal 10 at a request sender side, or an IP address indicating a position on a network that is allowed as a communication destination of a terminal 10 at a request sender side. In this case, the processing in each of the above-described steps can be performed by registering a phone number, an IP address, or the like corresponding to each of the terminal IDs of a member terminal, an owner terminal, and a user terminal in the group information management table (see FIG. 9) and the share request management table (FIG. 10).

In addition, a recording medium storing the terminal program, relay device program, communication management program, or communication terminal management program in the above-described embodiment, the HD 204 storing these programs, and the program providing system 90 including the HD 204 are used in the case where they are provided as program products at home or abroad to the users of the above-described terminal program, relay device program, communication management program, and communication terminal management program.

In addition, although the case of a video conference system has been described as an example of the communication system 1 in the above-described embodiment, the embodiment is not limited to this case, and the communication system 1 may be a phone system such as an Internet Protocol (IP) phone system or an Internet phone system. In addition, the communication system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car.

Further, the communication system 1 may be a cellular phone communication system. In this case, for example, the terminals 10 correspond to cellular phones.

In addition, although image data serving as sight data and sound data serving as hearing data are described as examples of content data in the above-described embodiment, the content data is not limited to these items of data, and the content data may be other five-sense data. For example, in the case where the content data is touch data, a sensation obtained by a user's contact at one terminal side is transmitted to the other terminal side. Further, in the case where the content data is smell data, a smell at one terminal side is transmitted to the other terminal side. In addition, in the case where the content data is taste data, a taste at one terminal side is transmitted to the other terminal side.

Further, it is sufficient for the content data to be at least one of image (sight) data, sound (hearing) data, touch data, smell data, and taste data.

In addition, although the case in which a video conference is held by the communication system 1 has been described in the above-described embodiment, the embodiment is not limited to this case. The communication system 1 may be used in meetings, general conversations between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A counterpart terminal information management system comprising:
    a terminal manager that manages, for each one of a plurality of terminals, terminal identification information for identifying the terminal, and terminal related information previously set by default, in association with each other;
    a counterpart terminal manager that manages, for each one of the plurality of terminal, the terminal identification information for identifying the terminal, counterpart terminal identification information for identifying a candidate counterpart terminal that may be requested by the terminal to have communication with, and counterpart terminal related information individually set by a user who operates the terminal, in association with one another;
    a receiver that receives, from a first terminal, a request to share a candidate counterpart terminal managed for the first terminal with a second terminal, and information indicating whether to permit or reject sharing of the counterpart terminal related information individually set by the user of the first terminal with the second terminal; and
    a transmitter that transmits information regarding the candidate counterpart terminal managed for the first terminal to the second terminal,
    wherein in response to the information indicating to permit sharing of the counterpart terminal related information, the transmitter transmits the counterpart terminal related information of the candidate counterpart terminal to be shared, which is managed by the counterpart terminal manager in association with the terminal identification information of the first terminal, and in response to the information indicating to reject sharing of the counterpart terminal related information, the transmitter transmits the terminal related information of the candidate counterpart terminal to be shared, which is managed by the terminal manager in association with the terminal identification information of the candidate counterpart terminal.

2. The system of claim 1, further comprising:

a determiner that determines whether the counterpart terminal manager stores terminal identification information for identifying the candidate counterpart terminal to be shared, in association with terminal identification information for identifying the second terminal, wherein, when the determiner determines that the counterpart terminal manager does not store the terminal identification information for identifying the candidate counterpart terminal to be shared, in association with the terminal identification information for identifying the second terminal, the counterpart terminal manager stores the terminal identification information for identifying the candidate counterpart terminal to be shared, in association with the terminal identification information for identifying the second terminal.

3. The system of claim 2, wherein the determiner further determines whether the counterpart terminal manager stores counterpart terminal related information individually set by a user who operates the second terminal, in association with the terminal identification for identifying the candidate counterpart terminal to be shared and the terminal identification information for identifying the second terminal, wherein, when the determiner determines that the counterpart terminal related information individually set by a user who operates the second terminal is stored, the transmitter transmits, to the second terminal, the counterpart terminal related information individually set by the user of the second terminal, in alternative to the counterpart terminal related information individually set by the user of the first terminal, as counterpart terminal related information of the candidate counterpart terminal to be shared.

4. The system of claim 3, wherein, when the determiner determines that the counterpart terminal related information individually set by a user who operates the second terminal is not stored, the counterpart terminal manager additionally stores the terminal identification information for identifying the candidate counterpart terminal to be shared, and the counterpart terminal related information individually set by the user of the first terminal, in association with the terminal identification information of the second terminal.

5. The system of claim 1, wherein, when the counterpart terminal related information indicates a name of the candidate counterpart terminal, the counterpart terminal related information individually set by the user of the terminal indicates a name of the candidate counterpart terminal individually set by the user of the terminal, and the terminal related information previously set by default indicates a name of the terminal previously set by default for use by the plurality of terminals.

6. The system of claim 1, wherein the counterpart terminal related information indicates a property of the candidate counterpart terminal.

7. A communication system comprising:

the system of claim 1; and a communication terminal, which is connected to the system through a network, comprising:

a user interface that receives a user input that requests to share a candidate counterpart terminal managed for the terminal with a counterpart terminal, and further receives a user input indicating whether to permit or reject sharing of the counterpart terminal related information individually set by a user who operates the terminal; and a transmitter that transmits, to a system, a request to share a candidate counterpart terminal with the counterpart terminal, and the information indicating whether to permit or reject sharing of the counterpart terminal related information.

8. A method of managing counterpart terminal information, comprising:

managing, for each one of a plurality of terminals, terminal identification information for identifying the terminal, and terminal related information previously set by default, in association with each other;

managing, for each one of the plurality of terminals, the terminal identification information for identifying the terminal, counterpart terminal identification information for identifying a candidate counterpart terminal that may be requested by the terminal to have communication with, and counterpart terminal related information individually set by a user who operates the terminal, in association with one another;

receiving, from a first terminal, a request to share a candidate counterpart terminal managed for the first terminal with a second terminal, and information indicating whether to permit or reject sharing of the counterpart terminal related information individually set by the user of the first terminal with the second terminal; and transmitting information regarding the candidate counterpart terminal managed for the first terminal to the second terminal, wherein in response to the information indicating to permit sharing of the counterpart terminal related information, transmitting the counterpart terminal related information of the candidate counterpart terminal to be shared, which is managed by a counterpart terminal manager in association with the terminal identification information of the first terminal, and in response to the information indicating to reject sharing of the counterpart terminal related information, transmitting the terminal related information of the candidate counterpart terminal to be shared, which is managed by the terminal manager in association with the terminal identification information of the candidate counterpart terminal.

9. A non-transitory recording medium which, when executed by one or more processors, cause the processor to perform a method of managing counterpart terminal information, comprising:

managing, for each one of a plurality of terminals, terminal identification information for identifying the terminal, and terminal related information previously set by default, in association with each other;

managing, for each one of the plurality of terminals, the terminal identification information for identifying the terminal, counterpart terminal identification information for identifying a candidate counterpart terminal that may be requested by the terminal to have communication with, and counterpart terminal related information individually set by a user who operates the terminal, in association with one another;

receiving, from a first terminal, a request to share a candidate counterpart terminal managed for the first terminal with a second terminal, and information indicating whether to permit or reject sharing of the counterpart terminal related information individually set by the user of the first terminal with the second terminal; and transmitting information regarding the candidate counterpart terminal managed for the first terminal to the second terminal, wherein in response to the information indicating to permit sharing of the counterpart terminal related information, transmitting the counterpart terminal related information of the candidate counterpart terminal to be shared, which is managed by a counterpart terminal manager in association with the terminal identification information of the first terminal, and in response to the information indicating to reject sharing of the counterpart terminal related information, transmitting the terminal related information of the candidate counterpart terminal to be shared, which is managed by the terminal manager in association with the terminal identification information of the candidate counterpart terminal.

\* \* \* \* \*